United States Patent [19]

Harvey

[11] Patent Number: 5,389,178
[45] Date of Patent: Feb. 14, 1995

[54] METHOD FOR IMPARTING IMPROVED ADHESION TO POLYOLEFIN SUBSTRATES

[75] Inventor: Noel G. Harvey, North Wales, Pa.

[73] Assignee: Rohm and Haas Company, Philadelphia, Pa.

[21] Appl. No.: 128,938

[22] Filed: Sep. 29, 1993

[30] Foreign Application Priority Data

Oct. 26, 1992 [GB] United Kingdom ............ 9222490

[51] Int. Cl.$^6$ ............................................. B32B 31/00
[52] U.S. Cl. ................................. 156/249; 156/254; 156/280; 156/306.3; 428/142; 428/543
[58] Field of Search ............ 156/249, 254, 306.3, 156/280; 428/142, 543

[56] References Cited

U.S. PATENT DOCUMENTS

| | | | |
|---|---|---|---|
| 3,520,753 | 7/1970 | Ryan et al | 156/249 |
| 3,798,096 | 3/1974 | Grunwald et al. | 156/151 |
| 4,096,202 | 6/1978 | Farnham et al. | |
| 4,895,760 | 1/1990 | Barger | 156/306.3 |
| 4,957,974 | 9/1990 | Ilenda et al. | |
| 5,035,933 | 7/1991 | Ilenda et al. | |
| 5,247,024 | 9/1993 | Natoli et al. | |

FOREIGN PATENT DOCUMENTS 1192688  8/1985  Canada.
2194541  8/1987  United Kingdom.

*Primary Examiner*—John J. Gallagher
*Attorney, Agent, or Firm*—Roger K. Graham

[57] ABSTRACT

Adhesion to polyolefin substrates of (meth)acrylic films or laminates or of coatings, inks, or paints is improved by forming a first film or sheet of a multi-stage polymer containing a crosslinked rubbery first-stage, applying the first film or sheet under heat and pressure to a polyolefin sheet or film, wherein the polyolefin is not rubber-modified, separating the two films or sheets mechanically to leave a thin tie-layer of the multi-stage polymer at or near the surface of the polyolefin sheet or film, and then laminating to the so-treated polyolefin sheet or film a (meth)acrylic sheet or film or applying a latex, paint, or ink.

5 Claims, No Drawings

METHOD FOR IMPARTING IMPROVED ADHESION TO POLYOLEFIN SUBSTRATES

BACKGROUND OF THE INVENTION

1. Field of the Invention

This invention is concerned with means for imparting improved adhesion to polyolefin substrates, especially polypropylene, of acrylic-based or other protective polymers, in the form of a plastic coating or a latex or solvent-based paint. The invention may be further applied to improve adherence or adhesion of pressure sensitive adhesives, which adhesives may serve to bond cloth, carpet, non-woven fabrics, plastics, and the like to the improved substrate. The invention is further concerned with means to an improved substrate for adherence of inks and colorants.

2. Description of the Prior Art

Matrix polyolefins used as substrates for acrylic plastics or for paints, inks, or latices, where the latter impart weatherability, decorative effects, printability, and the like, are useful in the assemblage of automobiles and other vehicles, such as automotive interiors, trunks (boots), truck (lorry) cabs, automotive exteriors, such as fender liners, bumpers, and the like, railroad car interiors, van (caravan) trim, and the like, equipment housing, furniture, and the like, where they offer advantages in cost and formability over metal or wood. Unfortunately, the polyolefins such as polypropylene or polyethylene do not adhere well without special treatment.

It was earlier found (U.S. patent application No. 93,126, filed Jul. 16, 1993) that acrylic plastics, more specifically polymers of methyl methacrylate, are useful for the above purposes when combined with a cheaper, tougher polyolefin in a laminar structure (which structure may require a laminating adhesive in the case of polyolefins to prevent delamination), and disclosed many potential uses for such a combination. In U.S. Pat. No. 4,957,974 is disclosed the use of specific graft copolymers of polyolefins and polymethacrylates, when further blended with polypropylene, as useful for improving printability, and the graft copolymers as tie layers between otherwise incompatible polymers. In U.S. Pat. No. 5,035,933 is disclosed the use of such graft copolymers as tie layers between polyolefins and certain barrier polymers. In U.S. Pat. No. 5,237,004 is disclosed a thermoplastic composition having modified optical properties which comprises a thermoplastic matrix polymer and distributed throughout the matrix polymer from about 0.1% to about 40% of the total composition weight of spherical particles of core/shell having an average diameter of from about 2 to about 15 microns (and a narrow particle size distribution), the outer shell of which is compatible with the matrix polymer. Polyolefins are known to the art to be incompatible with poly(methyl methacrylate). None of the above references teach or suggest the improved method for imparting adhesion to polyolefins disclosed herein.

SUMMARY OF THE INVENTION

I have found a novel method for further improving the adhesion in laminates of polyolefins, especially polypropylene or a non-rubbery propylene/ethylene copolymer, and (meth)acrylic polymers, which method is also useful for application of latices, paints, inks, and coatings. The invention comprises:

a) forming a first film or sheet of a multi-stage polymer containing a crosslinked rubbery core or first-stage formed predominantly (that is, at least about 80 weight percent) from butyl acrylate, of a particle size from about 0.5 to about 15 microns, and wherein the final-stage is formed predominantly (that is, at least about 80 weight percent) from methyl methacrylate, and wherein the ratio of first-stage to final-stage polymer is at least 3/2;

b) applying the first film or sheet under heat and pressure to a polyolefin, preferably where the polyolefin is polypropylene, sheet or film;

c) separating the two films or sheets mechanically to leave a thin tie-layer of the multi-stage polymer at or near the surface of the polyolefin sheet or film;

d) laminating to the so-treated polyolefin sheet or film a polar polymer, preferably a (meth) acrylic polymer, sheet or film or applying an acrylic latex and drying the latex to a laminated film. Acrylic-based solvent paints, urethane-based paints, inks, and other adherents may also be applied in this operation in a manner similar to the application of the acrylic latex.

DETAILED DESCRIPTION OF THE INVENTION AND THE PREFERRED EMBODIMENTS

A preferred first multi-stage polymer is that described in European Patent Application 269,324, now U.S. Pat. No. 5,237,004, incorporated by reference. The polypropylene or other polyolefin may further contain the additive described in U.S. Pat. No. 4,957,974 for the purposes of improving its melt processing and sag resistance during thermoforming. Surprisingly, the method is not applicable to the so-called TPOs, that is, polypropylene toughened with an EPDM elastomer; although the matte appearance is produced on the TPO surface, retention of the thin tie-coat is not detected, and the adhesion of paints is not improved.

The first film or sheet may be made by conventional means, such as extrusion, calendering, compressing molding, and the like. It may be applied to the polypropylene film or sheet by compression in a press with heat, by application through heated rolls, such as calendering, and the like. Continuous processes for extruding one or both films or sheets, contacting, separating, and re-using the first film or sheet in contact with additional polypropylene may be envisaged.

The first film or sheet may also be formed in situ by applying the powder or particles to the surface of the polyolefin substrate and compressing under heat and pressure to form the film or sheet of the first polymer contiguous to the polyolefin. It should be noted that the first polymers as tie layers are less effective in promoting adhesion; it is the surface contact with and then removal from the polypropylene which activates the polypropylene surface. Lamination of the final polar polymer may be conducted by methods described above.

The polyolefin containing the activated surface may be directly treated with paints, ink, and the like. The activated surface has small surface holes, similar in size to the crosslinked core portion of the first polymer; the surface, even after painting, has an attractive matte surface. However, acceptable adhesion of paint is found only when solvent-based acrylic paints or urethane-based paints are utilized; polyester/melamine-based automotive paints do not exhibit acceptable adhesion.

The polar polymer sheet or film to be laminated or adhered is preferably a (meth)acrylic polymer, and more preferably a sheet or film prepared predominantly, that is from at least about 80 weight-percent, of methyl methacrylate. Other polar polymers may be utilized, such as poly(vinyl chloride), polyamides, poly(ethylene terephthalate, and polycarbonate.

The resulting laminates may be painted, adhered to carpet, printed, and the like. They may be thermoformed into useful objects of commerce and transportation, such as machine housings, containers, automotive parts, and the like.

EXAMPLE I

A film 0.38 mm. thick is prepared by compression molding (240° C., ca. 20 metric tons) a polymer prepared by the process of Example 8 of European Patent Application 269,324, now U.S. Pat. No. 5,237,004. The polymer has an overall particle diameter of ca. 8 microns, and comprises a core which is predominantly formed from butyl acrylate, and a shell which is methyl methacrylate. The poly(methyl methacrylate) shell is believed incompatible with polyolefins.

Separately is prepared a film of a commercial polypropylene of 0.8 MFR of thickness 0.25 mm. The two films are pressed together in a Carver press under a pressure of circa 20 metric tons and a temperature of 240 degrees C. The films could be pulled apart by hand. The side of the polypropylene which contacts the acrylic polymer is matte in appearance, and is paintable. Paintability is judged by spray-painting parts with a standard solvent-based commercial interior/exterior enamel; after drying, the surface is subjected to a standard cross-hatch peel test, with essentially no paint lost to either adhesive or cohesive failure.

Microscopy indicates that the matte, paintable surface so obtained is fibrous. The shear deformation of the surface during the peeling results in fiber formation which extends ca. 30–40 nm. into the polypropylene surface. FTIR spectroscopy indicates the presence of an "acrylic" residue (ester carbonyl) at the surface.

COMPARATIVE EXAMPLES

In a similar manner, films are made from a core/shell polymer similar to that described in Example 26 of U.S. Pat. No. 4,096,202 and from a core/shell polymer of a 75/25 first-stage ratio but otherwise similar to that core/shell polymer described in Example 16 of European Patent Application 259,097. These two polymers when applied by the method of Example I also present a matted paintable surface, but adhesion of the solvent paint is much poorer than in Example I.

Multi-stage polymers are prepared by the method of U.S. Pat. No. 5,237,004, but with final stages which are polymers predominantly of isobutyl methacrylate or isobornyl methacrylate. Again, although a matted painted surface could be prepared, adhesion of the solvent paint is not acceptable.

I claim:

1. In the process for adhering polyolefin substrates to polar polymer films or laminates, the improvement which comprises:
   a) forming a first film or sheet of a multi-stage polymer containing a crosslinked rubbery first-stage formed predominantly from butyl acrylate, and wherein the second-stage is formed predominantly from methyl methacrylate, and wherein the particle size is from about 2 microns to about 15 microns, and wherein the ratio of first-stage to second-stage polymer is at least 3/2;
   b) applying the first film or sheet under heat and pressure to a polyolefin sheet or film, wherein the polyolefin is not rubber-modified;
   c) separating the two films or sheets mechanically to leave a thin tie-layer of the multi-stage polymer at or near the surface of the polyolefin sheet or film; and
   d) laminating to the tie-layer of the so-treated polyolefin sheet or film a polar polymer sheet or film.

2. The process of claim 1 wherein the polyolefin is polypropylene or a non-rubbery propylene/ethylene copolymer.

3. The process of claim 1 where in the polar polymer is a (meth)acrylic polymer.

4. In the process for adhering coatings, inks, or paints to polyolefin substrates, the improvement which comprises:
   a) forming a first film or sheet of a multi-stage polymer containing a crosslinked rubbery first-stage formed predominantly from butyl acrylate, and wherein the second-stage is formed predominantly from methyl methacrylate, and wherein the particle size is from about 2 to about 15 microns, and wherein the ratio of first-stage to second-stage polymer is at least 3/2;
   b) applying the first film or sheet under heat and pressure to a polyolefin sheet or film, wherein the polyolefin is not rubber-modified;
   c) separating the two films or sheets mechanically to leave a thin tie-layer of the multi-stage polymer at or near the surface of the polyolefin sheet or film;
   d) applying a latex, solvent-based acrylic paint, urethane-based paint or ink to the tie-layer of the polyolefin sheet or film; and
   (e) drying the latex, paint, or ink to an adherent film.

5. The process of claim 4 wherein the polyolefin is polypropylene or a non-rubbery propylene/ethylene copolymer.

* * * * *